United States Patent [19]

Kohama et al.

[11] Patent Number: 5,601,774
[45] Date of Patent: Feb. 11, 1997

[54] METHOD OF USING AN AQUEOUS MOLD-RELEASING AGENT

[75] Inventors: Hiroyuki Kohama; Hitonari Butsugan; Misako Higo; Nobuhiko Tachiiri, all of Shiga-ken, Japan

[73] Assignee: Kabushiki Kaisha Neos, Kobe, Japan

[21] Appl. No.: 185,238

[22] Filed: Jan. 24, 1994

Related U.S. Application Data

[63] Continuation of Ser. No. 791,321, Nov. 14, 1991, abandoned.

[30] Foreign Application Priority Data

Nov. 16, 1990 [JP] Japan ................... 2-312528

[51] Int. Cl.⁶ ........................................ B28B 7/36
[52] U.S. Cl. ............................. 264/338; 264/331.19
[58] Field of Search ............................ 264/338, 331.19

[56] References Cited

U.S. PATENT DOCUMENTS

| | | | |
|---|---|---|---|
| 3,872,038 | 3/1975 | Adams et al. | 106/38.22 |
| 3,911,056 | 10/1975 | Houghton . | |
| 4,041,003 | 8/1977 | Adelmann et al. | 524/87 |
| 4,308,063 | 12/1981 | Horiuchi et al. | 106/38.22 |
| 4,427,803 | 1/1984 | Fukui et al. | 106/38.22 |
| 4,438,001 | 3/1984 | Suzuki et al. | 252/8.7 |
| 4,666,518 | 5/1987 | Hallenbeck et al. | 106/38.25 |
| 4,806,571 | 2/1989 | Kuobel et al. | 252/182.15 |
| 4,873,020 | 10/1989 | Muggli | 252/355 |
| 5,008,065 | 4/1991 | Okamura et al. | 264/328.6 |
| 5,079,299 | 1/1992 | Hisamoto et al. | 525/100 |

FOREIGN PATENT DOCUMENTS

| | | |
|---|---|---|
| 0102240 | 3/1984 | European Pat. Off. . |
| 0164501 | 12/1985 | European Pat. Off. ......... 264/338 |
| 2182181 | 12/1973 | France . |
| 2361990 | 3/1978 | France . |
| 2383000 | 10/1978 | France . |
| 1590512 | 6/1981 | United Kingdom . |

OTHER PUBLICATIONS

International Polymer Science and Technology, vol. 7, No. 4, (1980), Shawbury GB, pp. 15–18, T. Yamada, "Mold Release Agents".

*Primary Examiner*—Allan R. Kuhns
*Attorney, Agent, or Firm*— Watson Cole Stevens Davis, P.L.L.C.

[57] ABSTRACT

The present invention provides an aqueous mold-releasing agent which exhibits an excellent mold-releasing property with a small applied amount thereof without causing roughened surfaces of molded articles. Said agent comprises at least one of the fluorine-containing sulfonates in combination with a wax and/or a silicone oil, said sulfonates being represented by the following formula (I):

$$(XSO_3)_l M \qquad (I)$$

, wherein X is any one of the following fluorine-containing groups:

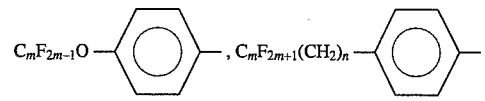

and $C_m F_{2m+1}(CH_2)_n-$ (n:0–2, m:1–12), M is an alkali metal, an alkaline earth metal, zinc, an alkylamine, an alkanolamine or ammonium, and l is 1 or 2.

2 Claims, No Drawings

METHOD OF USING AN AQUEOUS MOLD-RELEASING AGENT

This application is a Continuation of application Ser. No. 07/791,321, filed Nov. 14, 1991, now abandoned.

FIELD OF THE INVENTION

The present invention relates to an aqueous mold-releasing agent which exhibits an excellent mold-releasing property with a small applied amount thereof without causing roughened surfaces of molded articles.

BACKGROUND OF THE INVENTION

In a process for preparing the molded articles made of resins such as polyurethane and the like, a mold-releasing agent has heretofore been applied on inner walls of a mold prior to a molding in order to facilitate a release of the molded articles from the mold. The commonly used mold-releasing agent is a solvent type agent prepared by blending a wax, a silicone oil or fluorine compounds with an organic solvent.

In the case where the mold-releasing agent which contains the wax is used, (i) it is difficult to prepare the molded articles having smooth finishing surfaces, (ii) the wax adheres and remains on the surfaces of the molded articles because the agent must be applied in large quantities in order to obtain a sufficient releasing effect and (iii) a working hygienical problem arises because a petroleum solvent is used as a base solvent. When the mold-releasing agent which contains the silicone oil is used, the agent causes a trouble that the adhered silicone oil on the surfaces of the molded articles repels a paint during a process of the secondary treatment. Although the mold-releasing agent which contains the fluorine compounds exhibits an excellent releasing property in a small amount and does not cause the working hygienical problem, it has a difficult point that a use of flon group solvents which are the base solvent of said agent will completely be prohibited in the near future from the viewpoint of a global environmental problem wherein the ozonesphere is destroyed by said solvents.

Therefore, the development of an aqueous mold-releasing agent which can be substituted for the aforementioned solvent type agents is demanded. However, in the case where the aqueous mold-releasing agent is employed, there are problems that not only the resin components such as diisocyanate of foam urethane and the like which are materials of the molded articles are reacted with the remaining water in the mold to rough the surfaces of the molded articles but also the mold-releasing property itself is unsatisfactory.

In order to improve these problems, several aqueous mold-releasing agents have already been provided. For example, an aqueous mold-releasing agent containing emulsified wax which cuts off from the remaining water in the mold on the base of a mesomorphism by a nonionic surfactant (Japanese Patent KOKAI No. 22912/1986), a high solid type mold-releasing agent which consists of only mold-releasing ingredients is sprayed by means of an exclusive spray and an aqueous mold-releasing agent which comprises a fluorine-containing phosphate (Japanese Patent Kokoku No. 23270/1978) or a fluorine-containing phosphonate (Japanese Patent Kokoku No. 6329/1988 and ibid. No. 6330/1988 are cited.

However, in the case of the former two mold-releasing agents, the reactivity between water and resin ingredients cannot sufficiently be prevented and said agents are not put to practical use because the mold-releasing properties thereof are inferior and therefore said agents must be used in large quantities in order to obtain the satisfactory mold-releasing effect. In the case where the aqueous mold-releasing agent which comprises the fluorine-containing phosphate is employed, it is difficult to prepare said mold-releasing agent as an aqueous agent because of low solubility of the phosphate in water and the satisfactory mold-releasing effect has not actually been achieved.

OBJECT OF THE INVENTION

The object of the present invention is to provide an aqueous mold-releasing agent which exhibits an excellent mold-releasing property with a small applied amount thereof without bringing about the roughened surfaces of the molded articles caused by the water contained in the agent.

SUMMARY OF THE INVENTION

The present invention relates to the aqueous mold-releasing agent which comprises at least one of the fluorine-containing sulfonates in combination with a wax and/or a silicone oil, said sulfonates being represented by the following formula (I):

$$(XSO_3)_l M \qquad (I)$$

, wherein X is any one of the following fluorine-containing groups

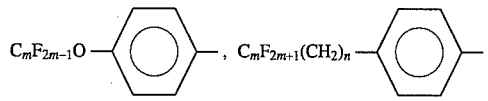

and $C_m F_{2m+1}(CH_2)_n-$ (n:0–2, m:1–12), M is an alkali metal, an alkaline earth metal, zinc, an alkylamine, an alkanolamine or ammonium, and l is 1 or 2.

DETAILED DESCRIPTION OF THE INVENTION

The aqueous mold-releasing agent according to the present invention comprises at least one of the fluorine-containing sulfonates represented by the following general formula (I) together with the wax and/or the silicone oil:

$$(XSO_3)_l M \qquad (I)$$

In the general formula (I), X shows the fluorine-containing groups such as

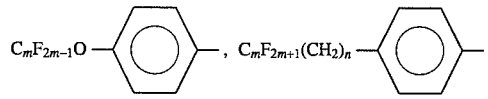

and $C_m F_{2m+1}(CH_2)_n-$, wherein n shows 0,1 or 2 and m shows 1–12, preferably 3–9. The perfluoroalkenyl groups or perfluoroalkane groups of the aforesaid fluorine-containing groups may have a branched chain.

In the general formula (I), M represents an alkali metal, an alkaline earth metal, zinc, an alkylamine, an alkanolamine or ammonium, and l is integer of 1 or 2. The preferred alkali metals are sodium and potassium and the preferred alkaline earth metals are calcium and magnesium. As an alkylamine, primary, secondary and tertiary amines having 1–12 carbon atoms including cyclic amines are exemplified. Monoethanolamine, diethanolamine, triethanolamine and the like are exemplified as an alkanolamine.

Particularly suitable sulfonates represented by the formula (I) are as follows:

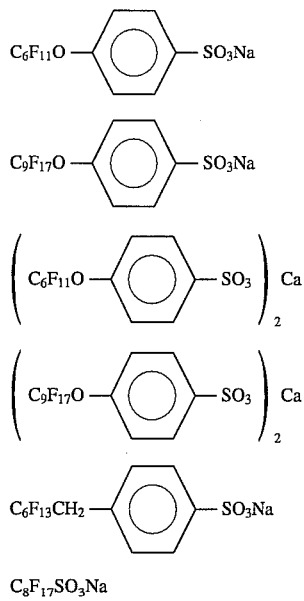

$C_8F_{17}SO_3Na$

Two or more of the aforementioned sulfonates may jointly be used as the occasion may demand.

As the wax used in the present invention, mineral waxes (e.g., montan wax, ozokerite and the like), petroleum waxes (e.g., paraffin wax, microcrystalline wax, petrolatum and the like), synthetic waxes (e.g., polyethylene wax, polyvinylether waxes and the like), modified waxes of the natural wax derivatives and the like are exemplified. Two or more of these waxes may be used at the same time, if necessary.

As the silicone oil used in the present invention, polysiloxanes having alkyl groups, phenyl groups or fluoroalkyl groups as their side chains and the like are exemplified. Two or more of these silicone oils may jointly be used as the occasion may demand. Additives such as silicone resin and the like may be added to the silicone oil.

The blending amounts of the aforementioned ingredients of the aqueous mold-releasing agent according to the present invention may suitably be determined depending on the kinds of resin materials of the molded articles, molding temperature, surface conditions of the molded articles, the kinds of the mold-releasing ingredients and the like and therefore said blending amounts are not limitative. Under normal conditions, 0.1–15 percent by weight, preferably 0.5–5.0 percent by weight of fluorine-containing sulfonate and 0.5–30 percent by weight, preferably 1–15 percent by weight, of the wax and/or the silicone oil are blended.

The aqueous mold-releasing agent according to the present invention may be prepared by solubilizing and/or emulsifying the aforesaid mold-releasing ingredients in water.

As an auxiliary agent for emulsifying the aforesaid mold-releasing ingredients in water, aqueous polar organic solvents having low boiling points which dry easily may be employed as the occasion may demand. As the aqueous polar organic solvents, methanol, ethanol, propanol, ethylene glycol dimethyl ether, tetrahydrofuran, dioxane, acetone, 2-butanone and the like are exemplified.

As an emulsifying agent, the publicly known surfactants may suitably be employed. The surfactants which may be sued in the present invention are as follows: aninonic surfactants (e.g., alkylbenzene sulfonates such as decylbenzene sulfonate, dodecylbenzene sulfonate and cetylbenzene sulfonate, polyoxyetylene monoalkylether sulfates such as lauryl ether sulfate having 2–4 moles of added etylene oxide, alkylnaphthyl sulfonates and the like), cationic surfactants (e.g., guaternary ammonium hydroxides and salts thereof such as octyltrimethyl ammonium hydroxide, dodecyltrimethyl ammonium hydroxide, octyldimethylbenzyl ammonium hydroxide, decyldimethylbenzyl ammonium hydroxide, didodecyldimethyl ammonium hydoxide, dioctadecyldimethyl ammonium hydroxide, beef tallow trimethyl ammonium hydroxide and coconut oil trimethyl ammonium hydroxide) and nonionic surfactants (e.g., polyoxyethylene alkylenealkyl ether, polyoxyethylene alkylenealkylphenol ether, polyoxyethylene alkylenealkyl ester, polyoxyalkylene sorbitan alkyl ester and polyoxyethylene fatty acid amides having $C_{10}$–$C_{18}$-lipophilic groups and 1–20 moles of added ethylene oxide).

Two or more of these surfactants may suitably be used, if necessary. These surfactants may be used in such an amount that the aforementioned mold-releasing ingredients can be emulsified in water and therefore the amounts of the surfactants to be used are not limitative. Under normal conditions, 2–75 parts by weight, preferably 10–30 parts by weight of the surfactants may be used, said amounts being based on 100 parts by weight of the mold-releasing ingredients mentioned above.

Suitable organic solvents such as cyclohexane and the like may be admixed with the aqueous mold-releasing agent according to the present invention in order to improve a levelling property of the wax, if necessary. In addition, other additives such as rust preventives, preservatives and the like may be added to the aqueous mold-reasing agent according to the present invention as the occasion may demand.

EXAMPLE

The present invention is illustrated by the following examples.

Example 1

One part by weight of polyoxyethylene oleyl ether (HLB:12) and 40 parts by weight of warm water (50°–60° C.) were admixed with a solution prepared by solubilizing 5 parts by weight of polyvinyl ether wax in 10 parts by weight of cyclohexane under heating. The wax emulsion was prepared by adding 2 parts by weight of polyoxyethylene oleyl ether (HLB:10) and 42 parts by weight of water to the aforesaid mixture under agitation. The aqueous mold-releasing agent (1) was prepared by admixing 3 g of 30%—methanolic solution of the fluorine-containing sulfonate I with 30 g of the wax emulsion.

The obtained aqueous mold-releasing agent (1) was subjected to the following mold-relasing power test.

Mold-releasing power test:

The mold-releasing agent is applied uniformly on the inner walls of the warmed (50° C.) apparatus made of aluminum for testing a mold-releasing power of a molded article (13 cm×10 cm×1 cm) produced therein by foaming under pressure by means of TI-506N model spray gun having nozzle diameter of 0.9 mm (Hokushin Seiki Inc.), said spray gun being 10–15 cm away from said inner walls. The polyol is blended with the diisocyanate under agitation for 5–7 seconds and then the mixture is poured into the apparatus. After 5 minutes, the hook of the apparatus is pulled by means of the push-pull scale and a necessary load to release a molded artcicle of semi-rigid urethane foam from the apparatus (mold-releasing power) is measured. The applied amount of the aqueous mold-releasing agent is also measured by determining a weight difference of the spray gun before and after application of said agent.

The mold-releasing power and the applied amount of the aqueous mold-releasing agent are shown in Table 1. The footnotes appeared in Table 1 are as follows:
1) Average molecular weight: 3000; melting point: 45°–48° C.
2) Average molecular weight: 2500; melting point: 45°–50° C.
3) Branched dimethyl polysiloxane (viscosity: 3500–5500 cs)
4) Alkylated silicone (viscosity: 500 cp)
5) Calcium perfluorohexenyloxy benzenesulfonate
6) Sodium perfluorohexenyloxy benzenesulfonate
7) Sodium 2,2-bis(trifluoromethyl)-3,3,4,4,5,5,5-heptafluoropentyl benzenesulfonate
8) Mixture of calcium perfluorohexenyloxy benzenesulfonate and sodium perfluorooctyl sulfonate in a weight ratio of 2:1
9) Zinc bis 4-perfluorononenyloxy benzenesulfonate
10) Diethanolamine 4-perfluorononenyloxy benzylphosphate
11) Polyoxyethylene oleyl ether (HLB:12) which is commercially available from Daiichi Kogyo Inc. as "Noygen ET 129"
12) Polyoxyethylene oleyl ether (HLB:10) which is commercially available from Daiichi Kogyo Inc. as "Noygen ET 109"
13) Unit of the blending amounts of the ingredient is percent by weight.

Example 2–10

The aqueous mold-releasing agents (2)–(10) were prepared on the basis of the blending ratios of the ingredients shown in Table 1 in accordance with the procedure described in Example 1. These agents were subjected to the aforementioned mold-releasing power test. The mold-releasing powers and the applied amounts of these agents are summarized in Table 1.

Comparative Examples (1')–(3')

The aqueous mold-releasing agents (1')–(3') were prepared on the basis of the blending ratios of the ingredients shown in Table 2 in accordance with the procedure described in Example 1. These agents were subjected to the aforesaid mold-releasing power test. The mold-releasing powers and the applied amounts of these agents are summarized in Table 2. The footnotes of Table 2 are the same as in Table 1.

The aqueous mold-releasing agent according to the present invention exhibits an excellent mold-releasing property with a small applied amount thereof without bringing about the roughened surfaces of the molded articles caused by the water contained in said agent. The working hygienical problems are not caused by said agent. Approximately same productivity as that achieved by employing the solvent type mold-releasing agent can be obtained by using the aqueous mold-releasing agent according to the present invention.

TABLE 1

| | The aqueous mold-releasing agents[13] | | | | | | | | | |
|---|---|---|---|---|---|---|---|---|---|---|
| | (1) | (2) | (3) | (4) | (5) | (6) | (7) | (8) | (9) | (10) |
| Polyvinlylether wax[1] | 4.5 | 4.3 | 4.3 | 4.4 | — | 4.3 | 4.1 | 4.3 | 4.0 | 4.3 |
| Polyethylene wax[2] | — | — | — | — | 4.3 | — | — | — | — | — |
| Silicone oil I[3] | — | 1.7 | 1.7 | 1.8 | 1.7 | — | 1.7 | 1.7 | 1.6 | 1.7 |
| Silicone oil II[4] | — | — | — | — | — | 1.8 | — | — | — | — |
| F-containing sulfonate I[5] | 2.7 | 2.6 | 2.6 | 1.8 | 2.6 | 2.6 | — | — | — | — |
| F-containing sulfonate II[6] | — | — | — | — | — | — | 2.5 | — | — | — |
| F-containing sulfonate III[7] | — | — | — | — | — | — | — | 2.6 | — | — |
| F-containing sulfonate IV[8] | — | — | — | — | — | — | — | — | 2.4 | — |
| F-containing sulfonate V[9] | — | — | — | — | — | — | — | — | — | 2.6 |
| F-containing phosphate [10] | — | — | — | — | — | — | — | — | — | — |
| Methanol | 6.4 | 6.1 | 6.1 | 4.2 | 6.1 | 6.1 | 6.1 | 6.1 | 6.8 | 6.1 |
| Cyclohexane | 9.0 | 8.6 | 8.6 | 8.9 | 8.6 | 8.6 | 9.9 | 8.6 | 8.0 | 8.6 |
| nonionic surfactant I[11] | 0.9 | 0.9 | 0.9 | 0.9 | 0.9 | 0.8 | 0.8 | 0.9 | 0.8 | 0.9 |
| nonionic surfactant II[12] | 1.8 | 1.7 | 1.7 | 1.8 | 1.7 | 1.7 | 1.7 | 1.7 | 1.6 | 1.7 |
| Water | 74.7 | 74.1 | 74.1 | 76.2 | 74.1 | 74.1 | 73.2 | 74.1 | 74.8 | 74.1 |
| Applied amount (g) | 1.03 | 1.02 | 1.56 | 0.94 | 1.02 | 0.88 | 0.99 | 0.97 | 1.29 | 1.18 |
| Mold-releasing power (kgf) | 6.8 | 2.2 | 0.9 | 5.4 | 3.0 | 3.8 | 8.0 | 11.0 | 1.7 | 3.5 |

TABLE 2

| | The aqueous mold-releasing agents[13] | | | | |
|---|---|---|---|---|---|
| | (1') | (2') | (3') | (4') | (5') |
| Polyvinlylether wax[1] | 5.0 | 4.7 | 8.6 | — | 4.3 |
| Polyethylene wax[2] | — | — | — | — | — |
| Silicone oil I[3] | — | 1.9 | — | — | 1.7 |
| Silicone oil II[4] | — | — | — | — | — |
| F-containing sulfonate I[5] | — | — | — | — | — |
| F-containing sulfonate II[6] | — | — | — | 8.6 | — |
| F-containing sulfonate III[7] | — | — | — | — | — |
| F-containing sulfonate IV[8] | — | — | — | — | — |
| F-containing sulfonate V[9] | — | — | — | — | — |
| F-containing phosphate [10] | — | — | — | — | 1.7 |
| Methanol | — | — | — | — | — |
| Cyclohexane | 10.0 | 9.2 | 17.2 | — | 8.6 |
| nonionic surfactant I[11] | 1.0 | 0.9 | 0.9 | — | 0.9 |
| nonionic surfactant II[12] | 2.0 | 1.9 | 1.7 | — | 1.7 |
| Water | 82.0 | 81.4 | 71.6 | 92.4 | 81.1 |

What is claimed is:

1. A method of molding polyurethane in a mold which method comprises:

applying to a mold cavity an aqueous mold-releasing agent comprising at least one of the fluorine-containing sulfonates in combination with a member selected from the group consisting of wax, a silicone oil and mixtures thereof, said sulfonates being represented by the following formula (I):

$$(XSO_3)_l M \quad (I)$$

wherein X is the following fluorine-containing groups:

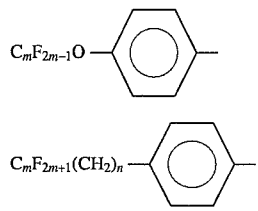

wherein m is 3–9 and n is 0–2, M is a member selected from the group consisting of an alkali metal atom, an alkaline earth metal atom, zinc atom, an alkylamine residue, an alkanolamine residue and an ammonium group, and l is equal to the valence of M, at least partially drying the mold-releasing agent and placing polyurethane into contact with the mold cavity.

2. The method of claim 1 wherein the mold-releasing agent is completely dried.

* * * * *